US009869599B2

(12) United States Patent
Schulte et al.

(10) Patent No.: US 9,869,599 B2
(45) Date of Patent: Jan. 16, 2018

(54) HIGH-TEMPERATURE PRESSURE SENSING (71) Applicant: Rosemount, Inc., Chanhassen, MN (US)

(72) Inventors: John Paul Schulte, Eden Prairie, MN (US); David Glen Tyson, Eden Prairie, MN (US)

(73) Assignee: Rosemount Inc., Chanhassen, MN (US)

( * ) Notice: Subject to any disclaimer, the term of this patent is extended or adjusted under 35 U.S.C. 154(b) by 253 days.

(21) Appl. No.: 14/501,617

(22) Filed: Sep. 30, 2014

(65) Prior Publication Data

US 2016/0091380 A1 Mar. 31, 2016

(51) Int. Cl.
*G01L 9/12* (2006.01)
(52) U.S. Cl.
CPC ............................ *G01L 9/12* (2013.01)
(58) Field of Classification Search
CPC .................................. G01L 9/12; G01L 9/10
See application file for complete search history.

(56) References Cited

U.S. PATENT DOCUMENTS

| | | | |
|---|---|---|---|
| 2,848,710 A | 8/1958 | Owen | |
| 3,271,669 A | 9/1966 | Lode | |
| 3,318,153 A * | 5/1967 | Lode | G01L 9/0072 324/661 |
| 3,869,676 A | 3/1975 | Harrison et al. | |
| 4,153,873 A * | 5/1979 | Grindheim | G01L 9/12 324/609 |
| 4,250,452 A * | 2/1981 | Gray | G01L 9/12 307/118 |
| 4,250,490 A | 2/1981 | Dahlke | |
| 4,398,426 A * | 8/1983 | Park | G01R 27/2605 702/138 |
| 2013/0269412 A1 * | 10/2013 | Walter | G01L 9/003 73/1.15 |
| 2015/0000417 A1 * | 1/2015 | Hedtke | G01L 9/0042 73/724 |

FOREIGN PATENT DOCUMENTS

EP 2 706 336 3/2014

OTHER PUBLICATIONS

Notification of Transmittal of the International Search Report and the Written Opinion of the International Searching Authority from PCT/US2015/050584, dated Jan. 5, 2016.
Communication from European Patent Application No. 15771416.3, dated May 10, 2017.

* cited by examiner

*Primary Examiner* — Nguyen Ha
(74) *Attorney, Agent, or Firm* — Westman, Champlin & Koehler, P.A.

(57) ABSTRACT

A pressure sensing system includes a hot zone electronics module, a cool zone electronics module and a plurality of conductors that connect the hot zone electronics module to the cool zone electronics module. The hot zone electronics module includes a capacitive pressure sensor and an oscillator that provides an oscillating signal to the capacitive pressure sensor. The hot zone electronics module provides at least one DC sensor signal. The cool zone electronics module converts the at least one DC sensor signal into a pressure value and provides a DC power signal. The plurality of conductors convey the DC power signal to the hot zone electronics module and convey the at least one DC sensor signal to the cool zone electronics module.

24 Claims, 4 Drawing Sheets

HIGH-TEMPERATURE PRESSURE SENSING

BACKGROUND

Embodiments described below relate to process field devices. In particular, the embodiments relate to capacitive sensors in process environments.

Some microelectronic circuit elements are rated to be used in ambient temperatures of no greater than 85° C. However, in many process control environments, the ambient or process temperature can exceed 200° C. As a result, standard electronics cannot be used to measure process variables such as pressure, motion, humidity, proximity and chemical concentration in these high-temperature environments. Instead, high-temperature electronics that are specifically designed to withstand temperatures in excess of 200° C. must be used. Unfortunately, such high-temperature electronics are much more expensive than standard electronics.

In addition, field devices in these high-temperature environments must be able to communicate with a control room in order to convey the process variable they are measuring. In some configurations, a very long conductor that extends between the high-temperature environment and a cooler environment is used for communication. For example, deep gas drilling occurs at depths greater than 15,000 feet. In order to monitor the state of the environment at the bottom of such wells, sensor assemblies need to be placed there. However, communication between such sensor assemblies and the top of the well is through a cable that extends the entire length of the well. Such cables have inherent line inductance, capacitance and resistance that degrade signals sent over the cables and can introduce signal ringing in the cables. The amount of inductance, capacitance and resistance in the cable is a function of the length of the cable. As the cable length increases, the inductance, capacitance and resistance increase and the degradation of the signal increases. This makes it difficult to transfer process variable values from the measurement environment to the control room.

The discussion above is merely provided for general background information and is not intended to be used as an aid in determining the scope of the claimed subject matter. The claimed subject matter is not limited to implementations that solve any or all disadvantages noted in the background.

SUMMARY

A pressure sensing system includes a hot zone electronics module, a cool zone electronics module and a plurality of conductors that connect the hot zone electronics module to the cool zone electronics module. The hot zone electronics module includes a capacitive pressure sensor, and an oscillator that provides an oscillating signal to the capacitive pressure sensor. The hot zone electronics module provides at least one DC sensor signal. The cool zone electronics module converts the at least one DC sensor signal into a pressure value and provides a DC power signal. The plurality of conductors convey the DC power signal to the hot zone electronics module and convey the at least one DC sensor signal to the cool zone electronics module.

In a further embodiment, a sensor apparatus is provided that includes sensor electronics comprising an oscillator, and a capacitive sensor. The sensor apparatus also includes conversion electronics that use at least two DC signals from the sensor electronics to form a value for a process variable. A multi-conductor cable comprising at least two conductors provides the at least two DC signals from the sensor electronics to the conversion electronics.

In accordance with a further embodiment, a method includes forming at least two DC sensor signals using a diode detector at a temperature greater than 200 degrees Celsius; conveying the at least two DC sensor signals across a multi-conductor cable to process variable calculation electronics; and converting the at least two DC sensor signals into a process variable value using the process variable calculation electronics at a temperature that is below 100 degrees Celsius.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

Embodiments described below provide a high-temperature capacitive sensing module that can be used in high-temperature environments without using a large number of high-temperature electronics while allowing the sensor assembly to transmit sensor signals across conductors to a cooler environment.

Figure 1:
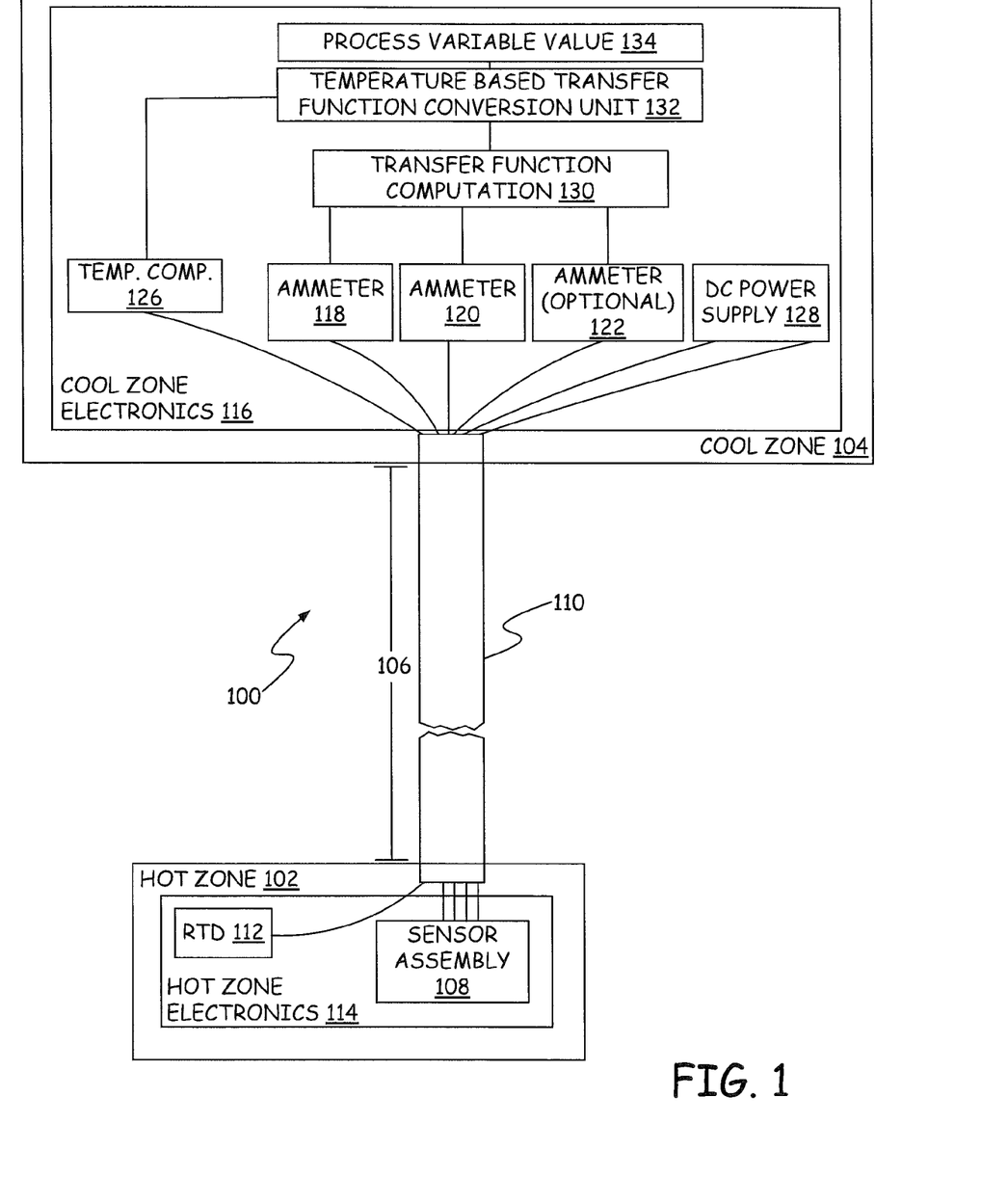
FIG. 1 provides a block diagram with a capacitive sensor measurement system in accordance with one embodiment.

FIG. 1 provides a block diagram of a capacitive measurement system in a process environment 100 in accordance with one embodiment. In process environment 100, there is a hot zone 102 that is separated from a cool zone 104 by a span 106. Hot zone 102 may be, for example, located within a fossil fuel well where temperatures can exceed 200° C. Cool zone 104 may be, for example, located above ground at a temperature below 85° C. Process control environment 100 includes environments in which span 106 is up to twenty thousand feet. Although span 106 can be as short as desired, the capacitive measurement system in accordance with the various embodiments is especially beneficial in environments where span 106 is greater than one hundred feet.

In hot zone 102, a sensor assembly 108 (also referred to as sensor electronics) is positioned to sense a process variable such as pressure, humidity, proximity, motion, vibration and chemical composition. Sensor assembly 108 receives power through and provides one or more sensor signals on a multi-conductor cable 110 that extends from hot zone 102 to cool zone 104. Hot zone 102 may optionally include a resistance temperature detector (RTD) 112 that provides a temperature value using one or more conductors of multi-conductor cable 110. Together, RTD 112 and sensor assembly 108 form hot zone electronics 114, which may be mounted on a single circuit board or may be distributed across multiple circuit boards.

In cool zone 104, cool zone electronics 116 (also referred to as process variable calculation electronics or conversion electronics) provide power to hot zone electronics 114, receive the sensor signals from hot zone electronics 114 over cable 110, and generate a process variable value 134 based on the sensor signals from hot zone electronics 114. In accordance with one embodiment, cool zone electronics 116 include ammeters 118, 120 and optionally ammeter 122 that are used to sense DC sensor signals provided by sensor assembly 108. In accordance with one embodiment, the conductors carrying the DC sensor signals are terminated in cool zone electronics 116 at a voltage close to a circuit common of sensor assembly 108. To achieve this, one input of each ammeters 118, 120 and 122 is connected to a conductor carrying the DC sensor signal and the other end is connected to a voltage such that the voltage of the conductors at the input to the ammeters is as close as possible to the circuit common of sensor assembly 108. Temperature computation circuit 126 uses the signals on the conductor(s) connected to RTD 112 to determine a temperature in hot zone 102. Note that a three or four wire connection may be required to RTD 112 for accurate measurements. A DC power supply 128 provides a DC voltage and DC current to sensor assembly 108, as described further below. The current values measured by ammeters 118, 120 and 122 are provided to a transfer function computation circuit 130, which determines a transfer function from the currents. The transfer function is then provided to a temperature-based transfer function conversion unit 132, which also receives the temperature determined by temperature computation unit 126. Conversion unit 132 converts the transfer function from transfer function computation circuit 130 into a process variable 134 using temperature-based coefficients and the temperature provided by temperature computation unit 126. Examples of process variable 134 include pressure, motion, vibration, proximity, humidity and chemical composition, for example.

Figure 2:
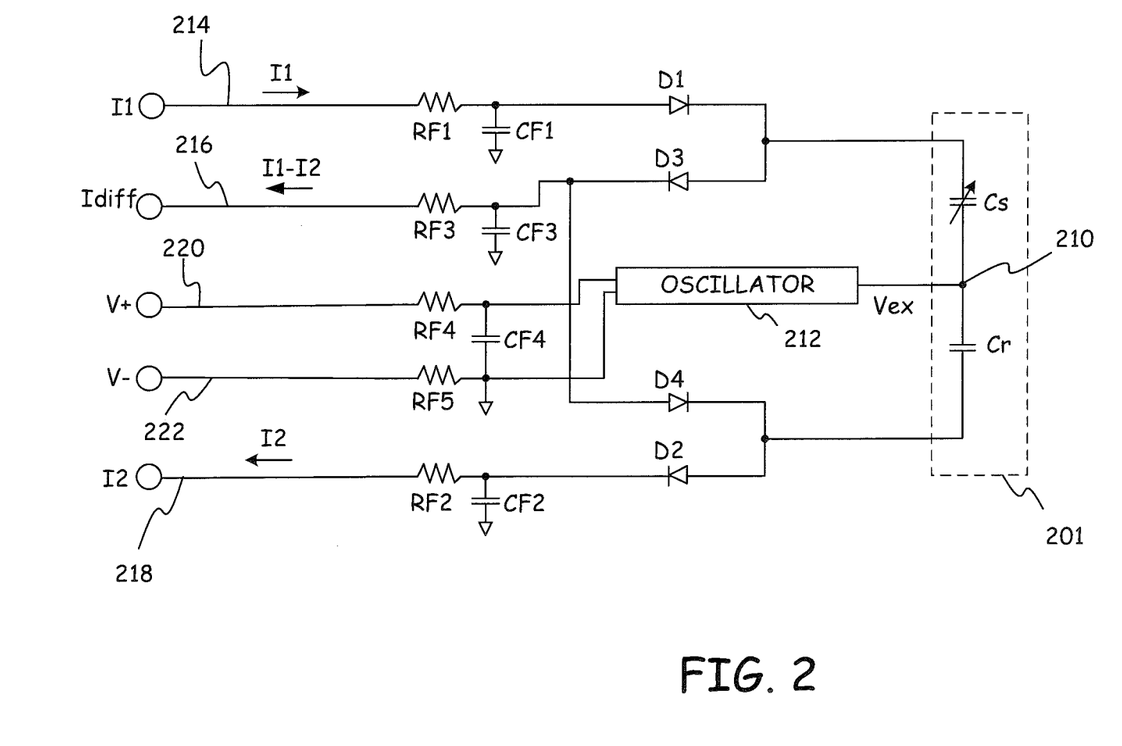
FIG. 2 provides a circuit diagram of a sensor assembly in accordance with one embodiment.

FIG. 2 provides a circuit diagram of a sensor assembly in accordance with one embodiment. In FIG. 2, a first capacitor Cs (also referred to as a capacitive sensor or capacitive pressure sensor), a second capacitor Cr (also referred to as a capacitive sensor or a capacitive pressure sensor) and a collection of diodes D1, D2, D3, and D4 form a diode detector that receives an oscillating signal from an oscillator 212 and generates DC current signals on conductors 214, 216 and 218. Oscillator 212 receives DC power supply signals on conductors 220 and 222. In accordance with one embodiment, capacitor Cr and capacitor Cs are part of a sapphire sensor 201.

The cathode of diode D1 is connected to the anode of diode D3 and to one side of capacitor Cs. The cathode of diode D3 is connected to the anode diode D4, which has its cathode connected to the anode of diode D2 and to one side of capacitor Cr. The sides of capacitor Cs and capacitor Cr that are not connected to the diodes are connected together at a common node 210 that receives the output of oscillator 212.

Conductors 214, 216, 218, 220 and 222 form part of cable 110 and extend across span 106, which in many embodiments exceeds 100 feet. Each of these conductors has an associated inductance that increases as the length of the conductor increases. In addition, each of these conductors has a capacitance between the conductor and shielding around the conductor. This capacitance also increases with the length of cable 110. Together, the capacitance and inductance of the conductors causes LC ringing, in which signal energy on the conductor oscillates between the inductance and the capacitance. To keep this ringing from affecting the diode detector or oscillator 212, line filters are preferably provided for each conductor consisting of resistors and capacitors that isolate the other components of sensor assembly 108 from the LC ringing. For example, resistor RF1 and capacitor CF1 prevent ringing on conductor 214 from reaching diode D1. Similarly, resistor RF3 and capacitor CF3 act as a line filter for conductor 216, resistor RF2 and capacitor CF2 act as a line filter for conductor 218, and resistors RF4 and RF5 and capacitor CF4 act as a line filter for conductors 220 and 222.

In operation, oscillator 212 receives a DC voltage across conductors 220 and 222 and converts this DC voltage into an oscillating signal. In accordance with one embodiment, the DC voltage is 10 volts DC and the oscillating signal Vex is 10 volts peak-to-peak at 50 kHz. The oscillating voltage signal appears across capacitor Cr in series with the parallel structure of diodes D2 and D4. Similarly, the oscillating voltage appears across capacitor Cs in series with the parallel structure of diodes D3 and D1. During positive portions of the oscillating signal, current flows through capacitor Cs and diode D3 producing a current I1 and a second current passes through capacitor Cr and diode D2 to produce a second current I2. During negative portions of the oscillating signal, a current I1 passes through diode D1 and capacitor Cs and a current I2 passes through diode D4 and capacitor Cr.

The inherent resistance and capacitance of conductors 214, 216 and 218 filter the current signals on the conductors to produce DC current signals on conductors 214, 216 and 218. DC current I1 will be equal to $VfC_s$, where V is the peak-to-peak voltage of the output of oscillator 212 less two forward-bias diode drops and f is the frequency of the output of oscillator 212. Similarly, current I2 will be equal to $VfC_r$, where $C_r$ is the capacitance of capacitor Cr. During operation, the capacitance of capacitor Cs changes as the process environment changes. For example, when capacitor Cs is a pressure sensor, pressure in the environment changes the capacitance of capacitor sensor Cs, such that current I1 changes as the pressure changes. Ideally, the capacitance of capacitor Cr remains unchanged even when the process environment changes. As a result, current I2 does not change as the process environment changes. Using current I1 and current I2, it is therefore possible to determine the relative capacitance of Cs and Cr and thus the state of the process environment. Techniques for making such determinations are discussed further below.

At high temperatures, diodes D1, D2, D3, and D4 suffer from performance degradation. In particular, leakage current when the diodes are reverse biased increases significantly with increases in temperature. Unfortunately, diodes that have lower leakage currents at high temperatures have longer reverse recovery times (the delay in transitioning from forward biased to reverse biased) and diodes that have shorter reverse recovery times have larger leakage currents at higher temperatures. In accordance with one embodiment, preference is given to diodes that have lower leakage currents at higher temperatures even though this comes at the cost of longer reverse recovery times. In accordance with one particular embodiment, a BAS 116 diode sold by semiconductor company Fairchild is used that has low leakage currents at temperatures in excess of 150° C. but that has a higher reverse recovery time than other diodes at that temperature. In accordance with another embodiment, a high-temperature diode that is fabricated using a Silicon on Insulator (SOI) fabrication process, such as XTR1N0450 sold by semiconductor company XREL, is used for diodes D1, D2, D3, and D4 and is rated for temperatures of 225° C. and above.

In accordance with one embodiment, line filter resistors RF1, RF2, RF3, RF4, and RF5 are each set to 100Ω, line filter capacitors CF1, CF2 and CF3 are set to 0.01 µF and line filter capacitor CF4 is set to 0.56 µF. Those skilled in the art will recognize that other values can be used for these components depending on the characteristics of cable 110.

In accordance with one embodiment, oscillator 212 is foamed as a relaxation oscillator. This type of oscillator is not as precise as a crystal-based oscillator in that a relaxation oscillator does not have a stable oscillating frequency. However, the diode detector of FIG. 2 is not frequency sensitive if ratiometric methods (described below) are used. Further, the diode detector of FIG. 2 is not sensitive to the voltage output of the oscillator and as such, the oscillator's voltage output also does not need to be stable.

Figure 3:
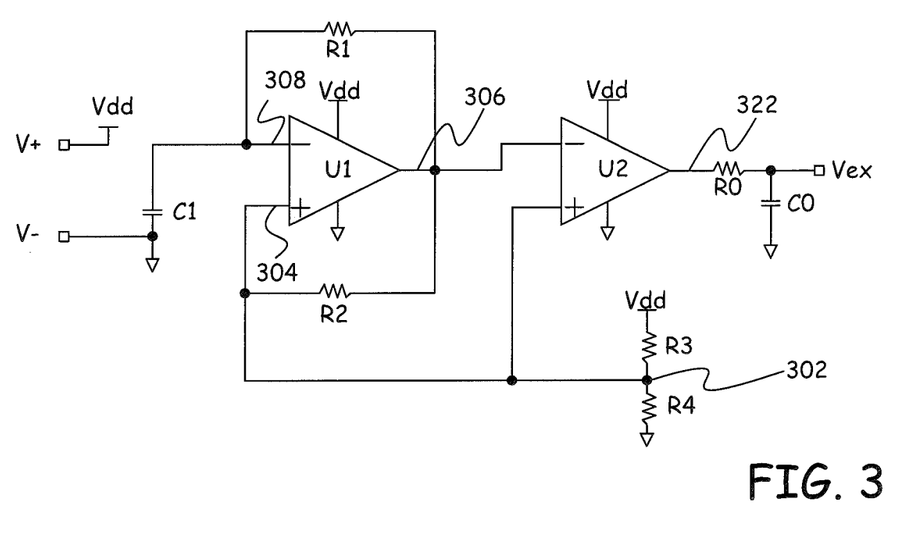
FIG. 3 provides a circuit diagram of an oscillator in accordance with one embodiment.

FIG. 3 provides a block diagram of one embodiment of a relaxation oscillator that can be used as oscillator 212 in FIG. 2. The relaxation oscillator of FIG. 3 is a comparator relaxation oscillator that utilizes a comparator constructed of an operational amplifier U1 that is powered by input DC voltage supply Vdd on conductor 220 and is connected to a common voltage provided on conductor 222. Power supply voltage Vdd is also applied to a voltage divider consisting of resistors R3 and R4 that in one embodiment are both 100 kΩ. The divided voltage at node 302 is provided to the non-inverting input 304 of operational amplifier U1 and to one side of feedback resistor R2. The other side of feedback resistor R2 is connected to the output 306 of operational amplifier U1. Output 306 is also provided to a negative feedback resistor R1, which has its other side connected to the inverting input 308 of operational amplifier U1. Inverting input 308 is also connected to one side of capacitor C1, which has its other side connected to the common voltage.

In operation, the voltage at non-inverting input 304 of operational amplifier U1 drives output 306 to the rail voltage Vdd. This in turn causes capacitor C1 to charge until the voltage on inverting input 308 reaches the voltage of non-inverting input 304 at which point output 306 of operational amplifier U1 drops to the common voltage. Current then flows through resistor R3 and the parallel resistance formed by resistors R4 and R2, thereby lowering the voltage at non-inverting input 304. Capacitor C1 discharges across resistor R1 until the voltage at inverting input 308 drops to the voltage at non-inverting input 304 thereby causing output 306 to be driven to Vdd once again. Thus, the oscillator produces an oscillating signal on output 306 while utilizing a hysteresis introduced by feedback resistor R2. In accordance with one embodiment, this hysteresis is around 1 volt.

In one particular embodiment, resistors R3 and R4 are 100 kΩ, resistor R2 is 450 kΩ, resistor R1 is 100 kΩ, capacitor C1 is 470 pF and voltage Vdd is 10 volts DC above the common voltage.

The oscillator of FIG. 3 also includes a second operational amplifier U2 that buffers output 306 of operational amplifier U1. The non-inverting node of operational amplifier U2 is connected to node 302 and the inverting input of operational amplifier U2 is connected to output 306 of operational amplifier U1. Output 322 of operational amplifier U2 is connected to a low-pass filter consisting of resistor R0 and capacitor C0, which in one embodiment have values of 1 kΩ and 1 nF. The low pass filter on output 322 of operational amplifier U2 reduces the slew rate of the output providing a more gradual change in the output voltage Vex. Although the output filter formed by R0 and C0 reduces the rate of change on the transitions, it still allows the full amplitude of the oscillation to reach the diode detector.

The frequency of the relaxation oscillator of FIG. 3 is dependent on the time constant established by the product R1*C1 and the hysteresis level. In accordance with one embodiment, the frequency is about 50 kHz.

Operational amplifiers U1 and U2 should have a push/pull output stage that can drive from the common voltage to the supply voltage Vdd and should be rated to operate up to 225° C. or beyond. This type of operational amplifier is possible in a Silicon on Insulator (SOI) process. One such operational amplifier is provided by Cissoid Volga. In addition, the resistors and capacitors in relaxation oscillator 212 of FIG. 3 should also be able to withstand temperatures in excess of 225° C.

All of the components in the sensor assembly of FIG. 2 including those in oscillator 212 must be able to withstand operating temperatures of 225° C. and above. The assembly and packaging of these components must also be suitable for high-temperature environments. Such packaging involves ceramic PWB substrates with gold wire traces. Integrated circuit components are mounted directly to the substrate and wire bonded to the traces. Passive components are surface mounted to the PWB. Through hole assembly is also possible. The entire assembly is housed in a hermetic metal package with glassed feed throughs. This type of assembly is known is a hybrid microcircuit.

In the embodiment shown in FIG. 2, there are five conductors with conductors 220 and 222 providing the supply voltages for oscillator 212 and conductors 214, 216 and 218 providing the DC sensor currents. As noted above, conductors 214, 216 and 218 are terminated in cool zone electronics 116 at voltage that is as close as possible to the circuit common inside sensor assembly 108. Conductor 214 provides current I1, conductor 218 provides current I2 and conductor 216 provides a difference current, which is the difference between current I1 through capacitor Cs and current I2 through capacitor Cr. In other embodiments, conductor 216 is removed and the node between the cathode of diode D3 and the anode of diode D4 is connected to the circuit common inside sensor assembly 108. In such an embodiment, only four conductors are needed to connect sensor assembly 108 to cool zone electronics 116. In such embodiments, the difference between current I1 and I2 can be computed within cool zone electronics 116 using the value of current I1 on conductor 214 and the value of current I2 on conductor 218.

As noted above, the current I1 through the capacitor Cs is equal to $fC_s(V_{ex}-2*0.5)$ where f is the frequency of the oscillator signal, $V_{ex}$ is the peak-to-peak voltage provided by the oscillator, $C_s$ is the capacitance of the capacitor and 0.5 is the voltage drop across a forward-biased diode. This means that I1 is affected not only by changes in the capacitance of capacitor Cs but also in changes in the frequency and peak-to-peak voltage of the oscillating signal. As noted above, relaxation oscillators, such as the one shown in FIG. 3, do not produce oscillating signals with stable frequencies or voltages. In accordance with one embodiment, in order to remove the effects of changes in the frequency and the peak-to-peak voltage associated with relaxation oscillators, embodiments herein utilize ratiometric expressions to form transfer functions that represent the capacitance of capacitor Cs relative to capacitor Cr. Such ratiometric expressions are not affected by changes in the frequency or peak-to-peak voltage of the oscillating signal since variations in the frequency and the peak-to-peak voltage affect capacitor Cs and the capacitor Cr equally. For example, one such ratiometric express is:

$$H1 = \frac{I1 - I2}{I1 + I2} = \frac{fC_s(V_{ex} - 2 \times 0.5) - fC_r(V_{ex} - 2 \times 0.5)}{fC_s(V_{ex} - 2 \times 0.5) + fC_r(V_{ex} - 2 \times 0.5)} = \frac{Cs - Cr}{Cs + Cr} \quad \text{EQ. 1}$$

where it can be seen that the terms f and $(V_{ex}-2\times 0.5)$ cancel out. For sapphire sensors, an alternative transfer function of:

$$H2 = \frac{I2}{I1} = \frac{Cr}{Cs} \quad \text{EQ. 2}$$

may be used. The transfer function of EQ. 2 produces an output that is linear with pressure for a sapphire sensor.

Figure 4:
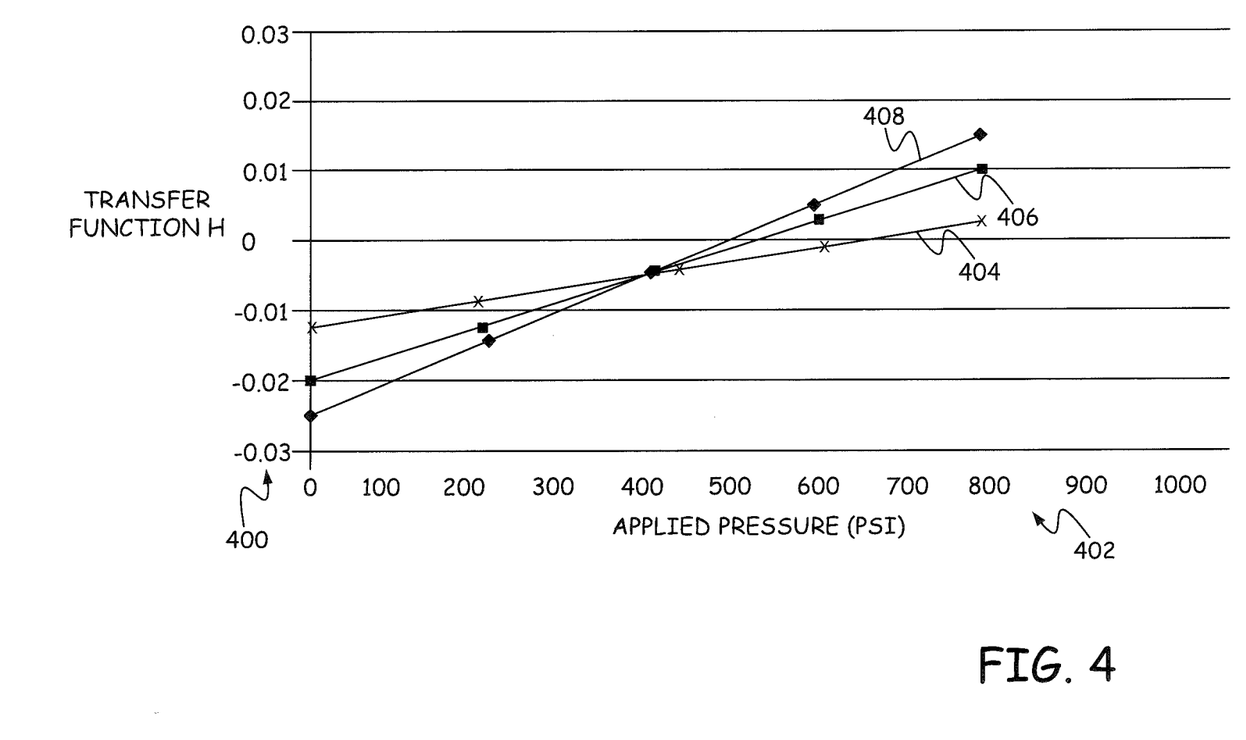
FIG. 4 provides a plurality of graphs showing the relationship between transfer function values and pressure values at various temperatures.

FIG. 4 provides a graph of the transfer function of Equation 1 for a set of pressures at different temperatures. In FIG. 4 the value of the transfer function is shown on vertical axis 400 and the pressure values are shown on horizontal axis 402. Graph 404 is for a temperature of 225° C., graph 406 is for a temperature of 150° C. and graph 408 is for a temperature of 25° C. As shown in FIG. 4, the transfer function changes as the temperature is altered. In accordance with one embodiment, in order for temperature-based transfer function conversion unit 132 of FIG. 1 to convert the transfer function computed by transfer function computation unit 130 into a pressure value 134, a polynomial with coefficients that are a function of temperature is applied to the transfer function value. In particular, the pressure value is determined as:

$$P = C_0(T) + C_1(T)H + C_2(T)H^2 + C_3(T)H^3 + C_4(T)H^4 + C_5(T)H^5 \quad \text{EQ. 3}$$

where P is the pressure value, H is the transfer function, $C_0(T)$, $C_1(T)$, $C_2(T)$, $C_3(T)$, $C_4(T)$, and $C_5(T)$ are the temperature-dependent coefficients and T is the temperature. The temperature-dependent coefficients can be determined via a characterization process.

Hot zone electronics 114 and cool zone electronics 116 may be used in a number of environments including to determine engine pressure measurements, sea measurements, geothermal energy measurements, plastic extrusion and other high temperature/high pressure environments.

In additional, although the peak-to-peak voltage of the output of oscillator 212 is shown to be the same as the supply voltage provided by DC power supply 128, in other embodiments, a transformer is provided at the output of oscillator 212 to boost the peak-to-peak voltage.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A pressure sensing system comprising:
   a hot zone electronics module having a capacitive pressure sensor which comprises a variable capacitor having a capacitance which changes as a function of applied pressure and a reference capacitor, and an oscillator that provides an oscillating signal to the capacitive pressure sensor, the hot zone electronics module providing at least a first DC sensor signal related to capacitance of the variable capacitor and a second DC sensor signal related to capacitance of the reference capacitor;
   a cool zone electronics module that converts the DC sensor signals into a pressure value and that provides a DC power signal; and
   a plurality of conductors that connect the hot zone electronics module to the cool zone electronics module and that convey the DC power signal to the hot zone electronics module, the plurality of electrical conductors including a first conductor that carries the first DC sensor signal and a second conductor that carries the second DC sensor signal, wherein the plurality of conductors comprise elongate conductors and the hot zone electronics module is located at a remote location relative to the cool zone electronics module, the hot zone electronics module comprises first and second voltage conductors which power the oscillator, a first DC conductor which carries current to the variable capacitor having a capacitance which changes as a function of applied pressure, a second DC conductor which carries current to the reference capacitor, and a difference current conductor which carries a current related to a difference in current flowing through the variable capacitor and the reference capacitor.

2. The pressure sensing system of claim 1 wherein the plurality of conductors each have a length that exceeds 100 feet.

3. The pressure sensing system of claim 1 wherein the plurality of conductors each have a length that exceeds 10,000 feet.

4. The pressure sensing system of claim 1 wherein the hot zone electronics module can operate at a temperature of 225 degrees Celsius.

5. The pressure sensing system of claim 1 further comprising at least one diode wherein the at least one diode and the capacitive pressure sensor form at least part of a diode detector.

6. The pressure sensing system of claim 5 wherein the at least one diode comprise at least one diode optimized for low leakage current.

7. The pressure sensing of claim 1 wherein the hot zone electronics module further comprises passive line filters for each of the plurality of conductors to isolate the capacitive pressure sensor, and the oscillator from LC ringing on the plurality of conductors.

8. The pressure sensing system of claim 1 wherein the oscillator comprises a relaxation oscillator.

9. The pressure sensing system of claim 1 wherein the hot zone electronics module is fabricated using hybrid microcircuit design.

10. The pressure sensing system of claim 1 wherein the cool zone electronics module utilizes ratiometric methods to form the pressure value from the at least one DC sensor signal.

11. The pressure sensing system of claim 10 wherein the pressure value is insensitive to a voltage level of the oscillating signal.

12. The pressure sensing system of claim 10 wherein the pressure value is insensitive to a frequency of the oscillating signal.

13. A sensor apparatus comprising:

sensor electronics comprising an oscillator, and a capacitive sensor providing two DC signals related to a process variable and a reference;

conversion electronics located remotely from the sensor electronics that use at least two DC signals from the sensor electronics to form a value for a process variable; and an elongate multi-conductor cable comprising at least two conductors that provide the at least two DC signals from the sensor electronics to the conversion electronics, wherein one of the at least two conductors carries a first DC sensor signal and the second of the at least two conductors carries a second DC sensor signal, and wherein the sensor electronics comprise first and second voltage conductors which power the oscillator in a hot zone electronics module, a first DC conductor which carries current to a variable capacitor of the sensor electronics, the variable capacitor having a variable capacitance which varies as a function of applied pressure, a second DC conductor which carries current to a reference capacitor of the sensor electronics, and a difference current conductor which carries a current related to a difference in current flowing through the variable capacitor and the reference capacitor.

14. The sensor apparatus of claim 13 wherein the sensor electronics are capable of operating at 225 degrees Celsius.

15. The sensor apparatus of claim 13 wherein the sensor electronics further comprise line filters for each of the at least two conductors to isolate the sensor electronics from inductance-capacitance ringing on the at least two conductors.

16. The sensor apparatus of claim 13 wherein the multi-conductor cable is at least one hundred feet long.

17. The sensor apparatus of claim 13 wherein the oscillator comprises a relaxation oscillator with an unstable oscillating frequency.

18. The sensor apparatus of claim 17 wherein the relaxation oscillator comprises a comparator relaxation oscillator.

19. A method comprising:

forming at least two DC sensor signals using a diode detector at a temperature greater than 200 degrees Celsius, the at least two DC sensor signals comprising a first DC sensor signal related to a sensed process variable and a second DC sensor signal related to a reference;

conveying the at least two DC sensor signals across an elongate multi-conductor cable to process variable calculation electronics located remotely from the diode detector by applying the first DC sensor signal to a first conductor and a second DC sensor signal to a second conductor of the multi-conductor cable, wherein the diode detector comprises first and second voltage conductors which power the oscillator in the diode detector, a first DC conductor which carries current to a variable capacitor in the diode detector, the variable capacitor having a variable capacitance which varies as a function of applied pressure, a second DC conductor which carries current to a reference capacitor in the diode detector, and a difference current conductor which carries a current related to a difference in current flowing through the variable capacitor and the reference capacitor;

converting the at least two DC sensor signals into a process variable value using the process variable calculation electronics at a temperature below 100 degrees Celsius.

20. The method of claim 19 wherein determining at least two DC sensor signals comprises generating an oscillating signal using an oscillator at a temperature greater than 200 degrees and applying the oscillating signal to the diode detector at a temperature greater than 200 degrees.

21. The method of claim 20 wherein the multi-conductor cable is greater than one hundred feet long.

22. The pressure sensor system of claim 1 wherein the capacitive pressure sensor comprises a sapphire pressure sensor.

23. The sensor apparatus of claim 13 wherein the capacitive sensor comprises a sapphire sensor.

24. The method of claim 19 including providing a sapphire pressure sensor configured to provide input signals to the diode detector.

* * * * *

UNITED STATES PATENT AND TRADEMARK OFFICE
CERTIFICATE OF CORRECTION

| | |
|---|---|
| PATENT NO. | : 9,869,599 B2 |
| APPLICATION NO. | : 14/501617 |
| DATED | : January 16, 2018 |
| INVENTOR(S) | : John Paul Schulte and David Glen Tyson |

Page 1 of 1

It is certified that error appears in the above-identified patent and that said Letters Patent is hereby corrected as shown below:

On the Title Page

Item (71) Please delete "Rosemount, Inc." as the applicant and replace it with -- Rosemount Inc. --

Signed and Sealed this
Twenty-ninth Day of January, 2019

Andrei Iancu
*Director of the United States Patent and Trademark Office*